United States Patent
Chiu et al.

(10) Patent No.: US 9,313,497 B2
(45) Date of Patent: Apr. 12, 2016

(54) SYSTEMS, METHODS, AND COMPUTER PROGRAM PRODUCTS FOR TRANSFORM COEFFICIENT SUB-SAMPLING

(71) Applicant: Intel Corporation, Santa Clara, CA (US)

(72) Inventors: Yi-Jen Chiu, San Jose, CA (US); Wenhao Zhang, Beijing (CN); Lidong Xu, Beijing (CN); Yu Han, Beijing (CN); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 636 days.

(21) Appl. No.: 13/709,780

(22) Filed: Dec. 10, 2012

(65) Prior Publication Data

US 2013/0188692 A1 Jul. 25, 2013

Related U.S. Application Data

(60) Provisional application No. 61/590,645, filed on Jan. 25, 2012.

(51) Int. Cl.

| | |
|---|---|
| *H04N 7/12* | (2006.01) |
| *H04N 19/60* | (2014.01) |
| *H04N 19/159* | (2014.01) |
| *H04N 19/176* | (2014.01) |
| *H04N 19/132* | (2014.01) |
| *H04N 19/154* | (2014.01) |
| *H04N 19/48* | (2014.01) |

(52) U.S. Cl.
CPC ....... *H04N 19/00775* (2013.01); *H04N 19/132* (2014.11); *H04N 19/154* (2014.11); *H04N 19/159* (2014.11); *H04N 19/176* (2014.11); *H04N 19/48* (2014.11)

(58) Field of Classification Search
CPC ............ H04N 19/00775; H04N 19/48; H04N 19/159; H04N 19/154; H04N 19/176; H04N 19/132

USPC .......................... 375/240.12, 240.26, 240.29
See application file for complete search history.

(56) References Cited

U.S. PATENT DOCUMENTS

2002/0186772 A1\* 12/2002 Li et al. .................... 375/240.18
2009/0097561 A1 4/2009 Chiu et al.
(Continued)

FOREIGN PATENT DOCUMENTS

| CN | 1939066 A | 3/2007 |
|---|---|---|
| CN | 102065302 A | 5/2011 |

OTHER PUBLICATIONS

International Search Report and Written Opinion Received for PCT Application No. PCT/CN2012/000890, mailed on Nov. 8, 2012, 10 pages.

*Primary Examiner* — Allen Wong
(74) *Attorney, Agent, or Firm* — Green, Howard & Mughal LLP

(57) ABSTRACT

Video compression encoding includes intra and inter prediction to reduce spatial and temporal redundancies in video. Prediction results or residuals represent differences between original video pixel values and predicted pixel values. The prediction residuals may be transformed into coefficients, referred to as transform coefficients, in the frequency domain. The transform coefficients may be quantized and entropy encoded. The transform coefficients can be sub-sampled prior to quantization to reduce their number. For example, sub-sampling may reduce more high frequency components than low frequency components represented in the transform coefficients. Therefore, sub-sampling reduces the number of transform coefficients that need to be quantized, reduces quantization complexity, and correspondingly increases throughput in the encoding.

28 Claims, 7 Drawing Sheets

(56) References Cited

U.S. PATENT DOCUMENTS

| | | | |
|---|---|---|---|
| 2009/0175357 A1* | 7/2009 | Suzuki | H04N 21/23424 375/240.26 |
| 2009/0285300 A1* | 11/2009 | Han | H04N 19/00587 375/240.16 |
| 2010/0128803 A1* | 5/2010 | Divorra Escoda | H04N 19/159 375/240.29 |
| 2011/0170608 A1* | 7/2011 | Shi et al. | 375/240.24 |
| 2013/0114695 A1* | 5/2013 | Joshi et al. | 375/240.03 |

* cited by examiner

SYSTEMS, METHODS, AND COMPUTER PROGRAM PRODUCTS FOR TRANSFORM COEFFICIENT SUB-SAMPLING

CROSS-REFERENCE TO RELATED APPLICATIONS

This application claims the benefit of U.S. Provisional Application Ser. No. 61/590,645, filed Jan. 25, 2012.

BACKGROUND

Compression encoding of video typically includes intra or inter prediction to reduce spatial and temporal redundancies in the video. The prediction results, i.e., prediction residuals representing differences between video pixel values and predicted pixel values, may be transformed into coefficients in the frequency domain. The coefficients are referred to as transform coefficients and may be large in number. The transform coefficients are quantized into quantization values, and the quantization values are entropy encoded. The larger the number of transform coefficients the higher the computational complexity encountered when the transform coefficients are quantized. Higher computational complexity disadvantageously results in lower overall video encoding throughput. Therefore, decreasing computational complexity when the number of transform coefficients is large is desirous, especially in demanding video applications that require high encoding throughput, such as real time video and multi-person gaming, for example.

BRIEF DESCRIPTION OF THE DRAWINGS/FIGURES

Figure 1:
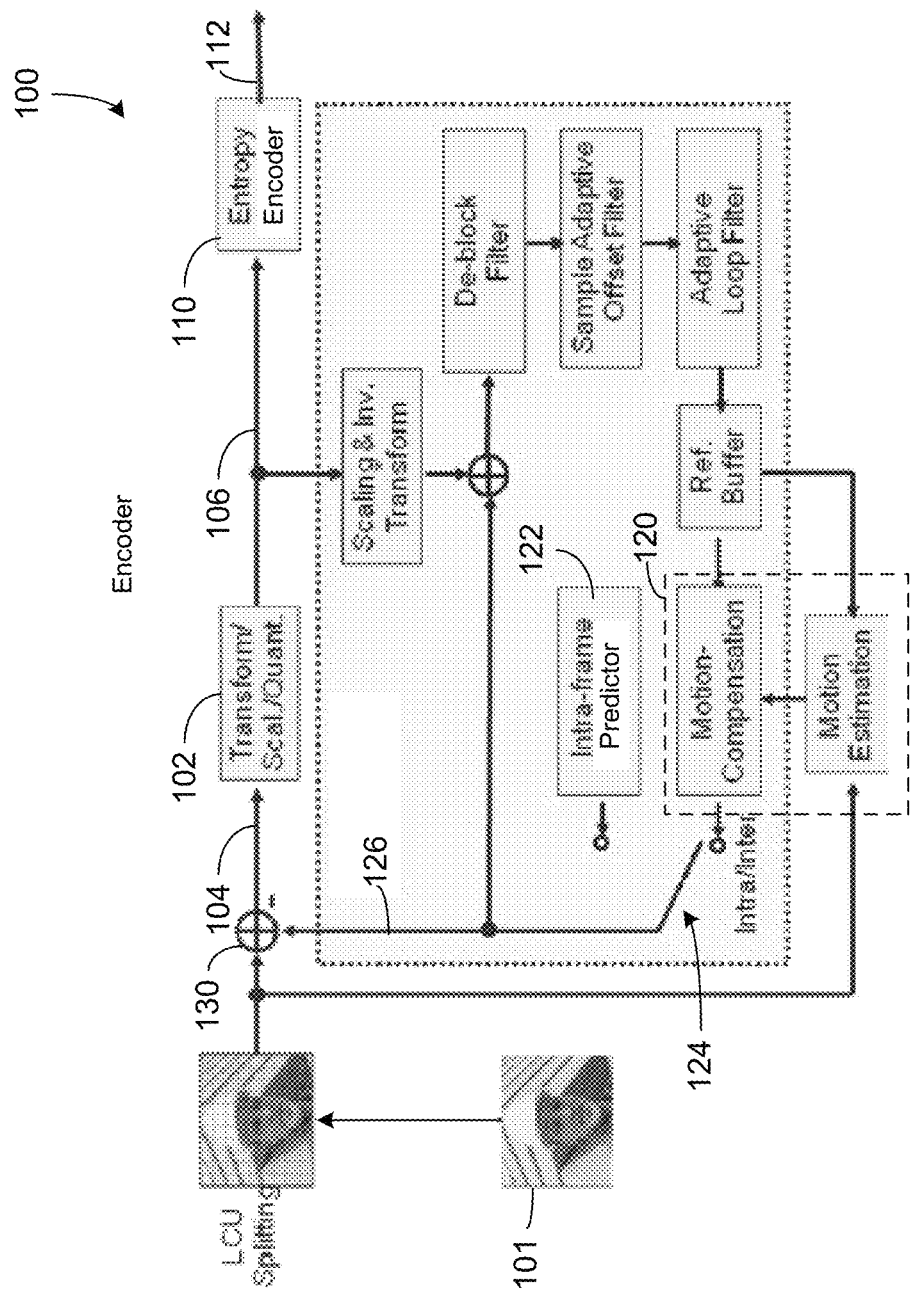
FIG. 1 is a block diagram of an example encoder to encode video.

In the drawings, the leftmost digit(s) of a reference number identifies the drawing in which the reference number first appears.

DETAILED DESCRIPTION

Embodiments are now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

System, method, and computer program product embodiments described herein are directed to sub-sampling and up-sampling of transform coefficients in image/video compression encoding and decoding, respectively. The sub-sampling advantageously reduces the number of transform coefficients that need to be quantized and, therefore, reduces computational complexity in the encoding. The sub-sampling embodiments are described below in connection with the High Efficient Video Coding (HEVC) standard by way of example, only. It is to be understood that such sub-sampling may be used in connection with any other video standard.

HEVC Protocol Overview

HEVC is a video compression standard under development by the Joint Collaborative Team on Video Coding (JCT-VC) formed by ISO/IEC Moving Picture Experts Group (MPEG) and ITU-T Video Coding Experts Group (VCEG). The terms "coding" and "encoding" as used herein are synonymous and interchangeable. To represent video with various resolutions, HEVC defines a triplet of units, including a coding unit (CU), a prediction unit (PU), and a transform unit (TU). The CU is the basic unit of compression. The PU is a unit of inter/intra prediction and there may be multiple PUs in a single CU. The TU is a unit of transform, and can include one or more PUs. Accordingly, a CU may include multiple PUs and TUs that are associated with that CU.

A video comprises a sequence of video frames or pictures. Each picture may be partitioned into one or more slices. Under HVEC, each slice may be divided into a sequence of tree blocks, or largest coding units (LCUs), that include both luma and chroma samples. An LCU may have a block size of 128×128, 64×64, 32×32, or 16×16, for example. A slice includes a number of consecutive non-overlapping LCUs in coding order. Each LCU may be split or subdivided into a hierarchy of CUs according to a recursive quadtree structure. For example, an LCU, as a root node of a quadtree, may be split into four child nodes, and each child node may in turn be a parent node and be split into another four child nodes. The splitting is accomplished using quadtree split flags. A final, un-split child or terminal node, as a leaf node of the quadtree, comprises a coding node, i.e., a coding video block. A size of the CU may range from a smallest block size of 8×8 up to the size of the LCU, with a maximum block size of 128×128.

Prediction methods are specified for terminal CUs that are not further split, i.e., the leaf nodes (coding nodes) of the CU hierarchical quadtree. The CU leaf nodes are split into basic units of prediction, referred to as the PUs. The PU specifies the method of prediction. Specifically, two primary parameters specify the prediction method associated with the PU: a prediction type/mode, and a PU splitting. The prediction mode is selected from one of intra prediction or inter prediction. Intra prediction involves prediction of a current video block relative to other video blocks in the same picture to remove spatial redundancies. Inter prediction involves prediction of a current video block relative to temporally-spaced, i.e., earlier and/or later, adjacent pictures, to remove temporal redundancies. For coding using intra prediction (i.e., intra coding), a 2N×2N CU may be coded in one 2N×2N PU or in four N×N PUs. For coding using inter prediction (i.e., inter coding), a 2N×2N CU may be coded in one 2N×2N PU, two 2N×N PUs, two N×2N PUs, 0.5N×2N PU+1.5N×2N PU, 1.5N×2N PU+0.5N×2N PU, 2N×0.5N PU+2N×1.5N PU, 2N×1.5N PU+2N×0.5N PU, or four N×N PUs.

A TU is used for the transform and quantization processes. A CU having one or more PUs may also include one or more transform units (TUs). The TUs define transforms, including a square quad-tree transform (SQT) and a non-square quadtree transform (NSQT). The SQT may have sizes of 32×32, 16×16, 8×8 and 4×4. The NSQT may have sizes of 32×8, 8×32, 16×4 and 4×16. In HEVC, following prediction, residual values corresponding to the PU may be calculated. The residual values may be formatted in blocks. The residual values comprise pixel difference values between a current block of video and a predictive block of video. The residual values may be transformed into transform coefficients in a frequency domain using the TU to produce a block of transform coefficients corresponding to the block of residual values. The transform coefficients indicate, or correspond to, frequency components, i.e., frequencies, of the video to be encoded and are, therefore, also referred to herein as frequency coefficients.

The block of transform coefficients may be scanned in a pre-defined order to produce serialized transform coefficients, and then the serialized transform coefficients may be entropy encoded. (CABAC is context-adaptive binary arithmetic coding)

The term video is construed broadly herein depending on the context to mean any of (i) "video block" or simply "block," (ii) video content, (iii) video frame or picture, (iv) video information, at any level of division, to be encoded, (v) encoded video information, at any level of division, to be decoded, and (vi) decoded video information resulting from the decoding process, where the level of division may be any of, e.g., a frame, a slice, an LCU, a CU (i.e., coding node or not), a PU, or a TU.

Encoder

FIG. 1 is a block diagram of an example HEVC encoder 100 to encode video 101. Video 101 is formatted in accordance with the HEVC triplet of CU, PU, and TU and then input to encoder 100. Encoder 100 includes a transformer/scaler/quantizer 102 to (i) transform prediction residual values 104 (also referred to herein as prediction residuals 104) (the origin of which is described below) into transform coefficients in a frequency domain, and then (ii) scale and quantize the transform coefficients, to produce quantization values 106. An entropy encoder 110 entropy encodes quantization values 106 to produce encoded quantization values 112. Entropy encoder 110 transmits encoded quantization values 112 in an encoded bit stream. Transformer/scaler/quantizer 102 may also include a sub-sampler (not shown in FIG. 1) to sub-sample the transform coefficients before they are quantized, as will be descried in detail below in connection with FIG. 2. Such a sub-sampler reduces the number of transform coefficients that are to be quantized and, therefore, reduces a quantization computational burden in entropy encoder 110.

Encoder 100 includes known prediction modules, including an inter predictor 120 to perform inter prediction (which involves motion compensation and motion estimation), and an intra predictor 122 to perform intra prediction of video, as would be appreciated by one of ordinary skill in the relevant arts. A selector 124 selects between prediction outputs of inter predictor 120 and intra predictor 122, and applies predicted video 126, either inter or intra prediction values from inter predictor 120 or intra predictor 122, respectively, to a subtractor 130. Subtractor 130 subtracts predicted video 126 from the HEVC formatted video derived from video 101, to produce prediction residuals 104 (mentioned above). Encoder 100 includes additional known encoder modules, including a scaling and inverse transform module, a de-block filter, a sample adaptive offset filter, an adaptive loop filter, and a reference buffer.

An HEVC decoder (not shown in FIG. 1) includes blocks that perform inverse functions that are complementary to those performed in the blocks of encoder 100.

Transform Coefficient Sub-Sampling

Figure 2:
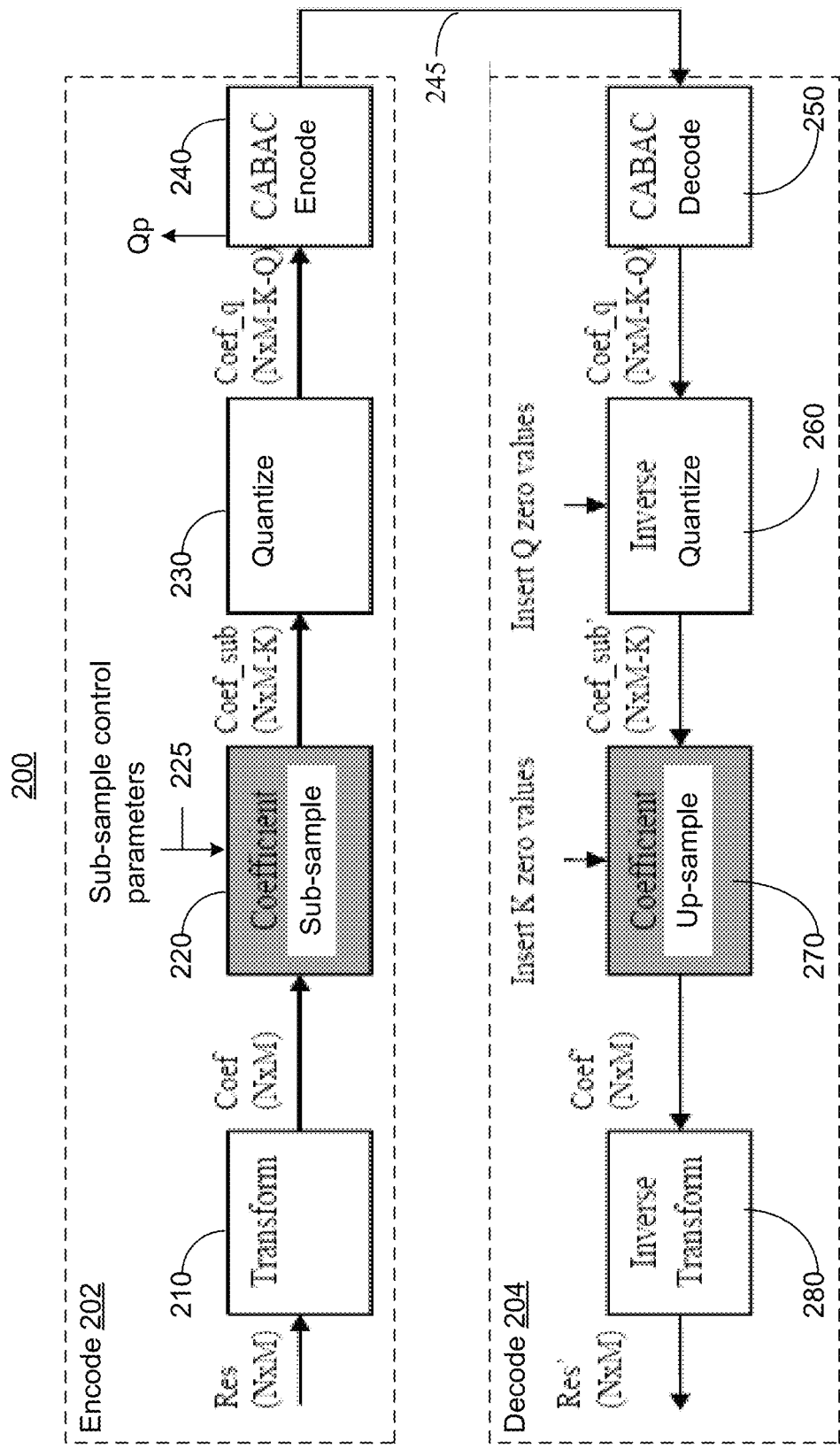
FIG. 2 is flowchart of an example method performed in an coder-decoder (codec).

FIG. 2 is flowchart of an example method 200 performed in a coder-decoder (codec), including an encoding method 202 that includes sub-sampling and a decoding method 204 that includes up-sampling (i.e., the inverse or reverse of sub-sampling). Encoding method 202 may be performed in a video encoder, and decoding method 204 may be performed in a video decoder complementary to the encoder.

Encoding 202 receives an N×M block of prediction residuals Res.

Transforming 210 includes transforming the block of prediction residuals Res using an N×M TU or "transform core" to produce a block, e.g., a two-dimensional (2-D) array, of N×M transform coefficients Coef in the frequency domain. Transform coefficients Coef represent frequencies that span a transform coefficient frequency range. The transform coefficients may be arranged in a predetermined frequency order. For example, the transform coefficients Coef may be arranged in an order of increasing frequency from a lowest frequency to a highest frequency, and may include a center frequency between the highest and lowest frequencies.

Sub-sampling 220 includes sub-sampling the block of N×M transform coefficients Coef based on a set of sub-sample control parameters 225, to remove some of the transform coefficients, e.g., a number K (where K>0) of the transform coefficients, and thereby produce N×M−K transform coefficients Coef_sub (also referred to herein as "sub-sampled transform coefficients Coef_sub"). The number of sub-sampled transform coefficients Coef_sub is less than the number of transform coefficients Coef, by the number K. In other words, sub-sampling 220 reduces, by the number K, the number N×M of transform coefficients Coef that would otherwise need to be quantized in the absence of sub-sampling. Since transform coefficients Coef_sub represent transform frequencies, the result of sub-sampling is to remove some of those frequencies. Sub-sample control parameters 225 include one or more decimation ratios, one or more phases, and a frequency range across which sub-sampling is to occur, as will be described in detail below in connection with FIGS. 3 and 4.

In a 2-D sub-sampling embodiment, sub-sampling 230 may include sub-sampling the block (e.g., 2-D array) of N×M transform coefficients Coef directly, i.e., performing 2-D sub-sampling to remove transform coefficients directly from the 2-D array. In a 1-D sub-sampling embodiment, sub-sampling 230 includes, first, scanning the N×M block of transform coefficients Coef into a one-dimensional (1-D) array in an order of increasing frequency, from the lowest frequency to the highest frequency, using any of, e.g., a horizontal scan order, a vertical scan order, a zigzag scan order, and a diagonal scan order, and then sub-sampling the 1-D array, i.e., performing 1-D sub-sampling to remove transform coefficients from the 1-D array.

Quantizing 230 includes quantizing the N×M−K sub-sampled transform coefficients, based on a quantization parameter Qp that indicates a quantization step size, to produce N×M−K quantized, sub-sampled, transform coefficients Coef_q (also referred to herein as "quantized coefficients Coef_q" or "quantization values Coef_q"). In HEVC, a number, Q (not to be confused with the quantization parameter Qp), of sub-sampled transform coefficients Coef_sub have values that fall into a so-called "dead zone." The dead zone refers to a region of values for the coefficients below which any coefficient value will be quantized to zero. In other words, if a coefficient value is in the dead zone, quantization of that given coefficient will result in a quantization value of zero. Accordingly, the Q sub-sampled transform coefficients that fall in the dead zone result in Q quantized coefficients that are each equal to zero. These Q quantized coefficients may be removed from the N×M−K quantized coefficients, to further reduce the number of quantized coefficients that need to be quantized to N×M−K−Q.

Transforming 210, transform coefficient sub-sampling 220, and quantizing 230 described above may all be performed in transformer/scaler/quantizer 102 of encoder 100 depicted in FIG. 1.

As mentioned above, quantizing 230 is performed based on quantization parameter Qp that is determined based on content in the input video to be encoded, which generally changes over time. Increases and decreases in Qp result in corresponding decreases and increases in the number of quantization values produced in the quantizing 230, respectively. Accordingly, sub-sampling 220 may include adaptively adjusting one of more of the sub-sample control parameters based on quantizing quantization parameter Qp (which may be provided as an input to sub-sampling 220), so as to cause the sub-sampling to remove a number of the transform coefficients that increases and decreases respectively when the quantization parameter decreases and increases with changes in the video.

Entropy encoding 240 includes entropy encoding the N×M−K−Q quantized coefficients, to produce N×M−K−Q encoded values. The entropy encoded values and the sub-sample control parameters are embedded in an encoded bit stream 245, which is then transmitted. Entropy encoding 240 may include lossless entropy encoding, e.g., context-adaptive binary arithmetic coding (CABAC).

Decoding 204 receives encoded bit stream 245 transmitted from entropy encoding 240.

250 includes (i) recovering the sub-sample control parameters 225 from encoded bitstream 245, and (ii) decoding the encoded quantized coefficients from the bitstream, to recover the N×M−K−Q quantized coefficients Coef_q therein (i.e., to recover the sub-sampled, quantized, transform coefficients Coef_q). Decoding 250 may include lossless entropy decoding, e.g., decoding in accordance with CABAC.

Inverse quantizing 260 includes inverse quantizing quantized coefficients Coef_q to produce N×M−K sub-sampled transform coefficients Coef_sub'. To compensate for the dead zone processing in quantizing 230, inverse quantizing 260 includes inserting Q zero values, to invert the removing of the Q zero values corresponding to the dead zone in quantizing 230.

Up-sampling 270 includes up-sampling the N×M−K sub-sampled transform coefficients Coef_sub' based on the recovered sub-sample control parameters 225, to produce N×M transform coefficients Coef'. The up-sampling in 270 may include inserting K zero values into the N×M−K sub-sampled transform coefficients Coef_sub' to produce the N×M transform coefficients Coef'.

Inverse transforming 280 includes inverse transforming transform coefficients Coef' according to an inverse TU or "inverse transform core", to produce N×M prediction residuals Res'.

As mentioned above, sub-sample control parameters 225 control the sub-sampling of transform coefficients Coef. The sub-sample control parameters 225 may include the following two groups of parameters:

1. Sub-sampling pattern to specify a ratio and a phase used in the sub-sampling; and
2. Sub-sampling position to specify starting and ending transform coefficients among transform coefficients Coef between which coefficient sub-sampling is to occur. Because transform coefficients Coef represent frequencies, which may be arranged, e.g., in an order of increasing frequency, the starting and ending transform coefficients represent starting and ending frequencies, respectively. The starting and ending frequencies define a frequency range that is less than or equal to a full frequency range of the transform coefficients, and across which the sub-sampling is to occur.

1-D Sub-Sampling

As mentioned above in the 1-D sub-sampling embodiment, before 1-D sub-sampling, a 2-D array or block of transform coefficients may be scanned into a 1-D array in an order of increasing frequency from a lowest frequency to a highest frequency. Then, 1-D sub-sampling may be performed on the 1-D array based on sub-sample control parameters 225.

Assume that the TU or transform core used in transforming 210 is of size N×M, and the transform coefficients scanned into the 1-D array are indexed from 0 to N×M−1. Then sub-sample control parameters 225 are referred to as 1-D sub-sample control parameters, which may include the following.

Figure 3:
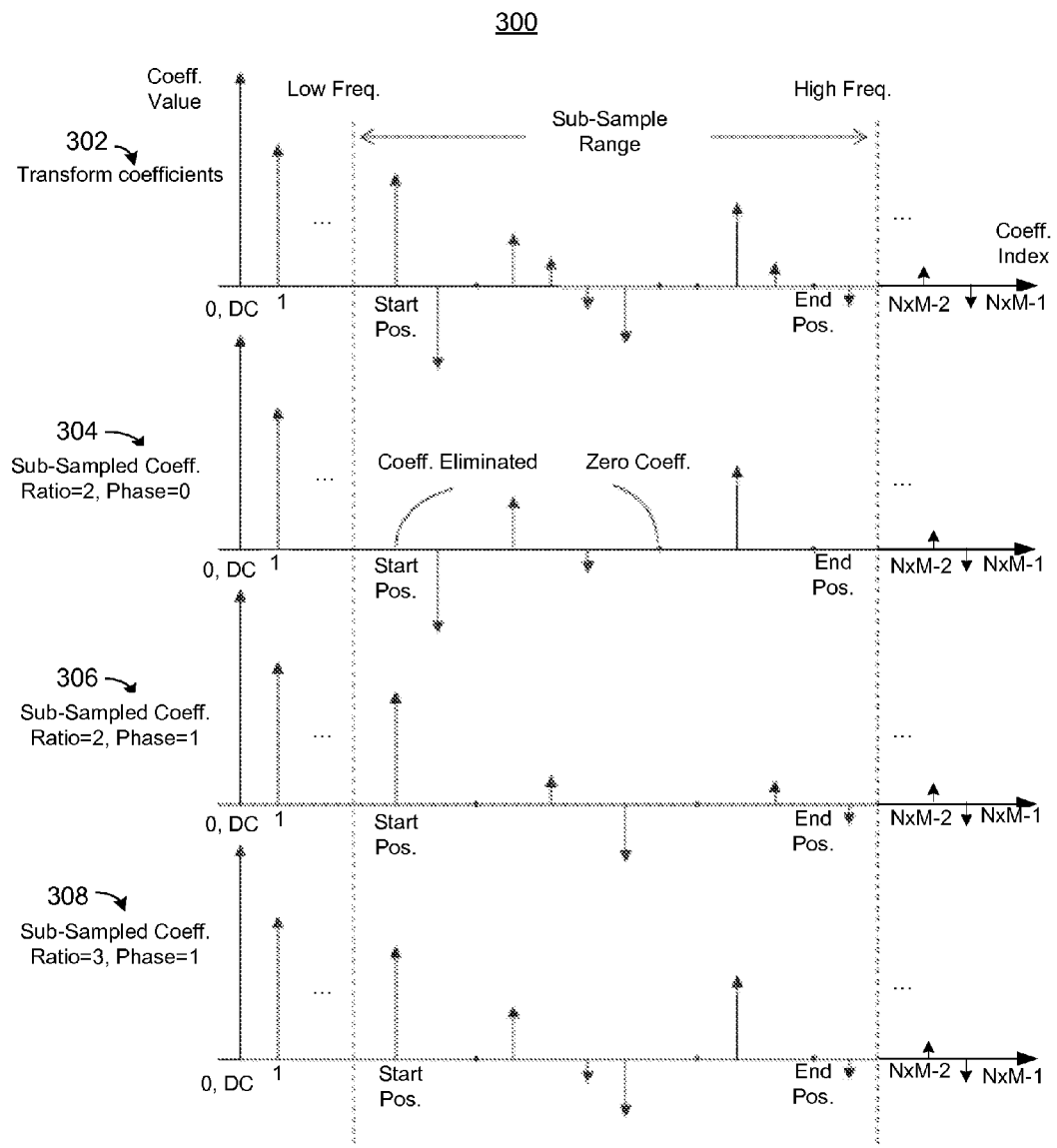
FIG. 3 is an illustration of several examples of one-dimensional (1-D) sub-sampling of transform coefficients arranged in one dimension.

1. Sub-Sampling Pattern:
  a) Ratio R to specify a 1-D decimation factor. Ratio R may be an integer value in the range of [1, N×M−1]. Ratio R indicates that the sub-sampling is to remove every $R^{th}$ transform coefficient. Therefore, other control parameters being constant, an increase/decrease in R causes sub-sampling to remove less/more transform coefficients, respectively; and
  b) Phase. Sub-sampling includes dividing the 1-D transform coefficients into successive groups, referred to as periods, each including R transform coefficients. The phase indicates a coefficient to be removed, in each group of R coefficients, as an offset from the beginning of each period. Therefore, the phase may be an integer in a range of [0, R−1]. A phase=0 indicates the first coefficient in each group is to be removed, a phase=1 indicates the second coefficient in each group is to be removed, and so on.
2. Sub-Sampling Positions:
  a) Starting position indicates a starting transform coefficient (and thus, a corresponding starting frequency) from which the sub-sampling will start. The starting position may be an integer in the range of [0, N×M−1];
  b) Ending position indicates an ending transform coefficient (and thus, a corresponding ending frequency) at which the sub-sampling will finish. If the starting position is equal to S, the ending position may be an integer in the range of [S, N×M−1]. Together, the starting and ending positions define a frequency range that is less than or equal to the frequency range of the transform coefficients and across which the sub-sampling is to occur. Therefore, other control parameters being constant, an increase/decrease in the sub-sample frequency range causes sub-sampling to remove more/less transform coefficients, respectively;

FIG. 3 is an illustration 300 of several examples of 1-D sub-sampling of transform coefficients 302 arranged in one dimension, e.g., in a 1-D array or sequence. Each sub-sampling example corresponds to different sub-sample control parameters, i.e., different ratio R and phase.

In a first example, sub-sampled transform coefficients 304 result from 1-D sub-sampling of transform coefficients 302 based on a ratio=2 and a phase=0 (the 1-D sub-sample control parameters).

In a second example, sub-sampled transform coefficients 306 result from 1-D sub-sampling of transform coefficients 302 based on a ratio=2 and a phase=1.

In a third example, sub-sampled transform coefficients 308 result from 1-D sub-sampling of transform coefficients 302 based on a ratio=3 and a phase=1.

In each of the examples, the same starting and ending positions define a same sub-sample frequency range (between a low/starting frequency coinciding with the starting position and a high/ending frequency coinciding with the ending position) that is less than the full frequency range of the transform coefficients and across which sub-sampling is performed.

The transform coefficients may be arranged in an order of increasing frequency over a transform coefficient frequency range including a first number of higher frequencies and a second number of lower frequencies that are positioned above and below a center frequency of the frequency range, respectively. The transform coefficients have an energy density that tends to be concentrated, i.e., higher, at the lower frequencies than at the higher frequencies, because energy density at the higher frequencies tends to be sparse. The human visual system is more responsive to the lower frequencies. Therefore, sub-sampling to remove more of the higher frequencies relative to the lower frequencies results in reduced computational complexity in the quantizer but does not significantly impact perceptual quality of the video caused by the encoding.

Accordingly, in an embodiment, sub-sampling may include sub-sampling the transform coefficients over a sub-sample frequency range positioned relative to the transform coefficient frequency range such that sub-sampling removes more of the second number of higher frequencies than the first number of lower frequencies in order to deemphasize the higher frequencies relative to the lower frequencies. For example, the starting and ending transform coefficients may be selected to define a sub-sampling frequency range having a center frequency that is greater than a center frequency of the transform coefficient frequency range so that sub-sampling is centered on the higher end of the transform coefficient frequency range.

2-D Transform Coefficient Sub-Sampling

2-D transform coefficient sub-sampling (also referred to herein as 2-D sub-sampling) refers to sub-sampling of a 2-D block of transform coefficients, directly, i.e., prior to scanning of the transform coefficients into one-dimension. Assuming that the TU or transform core has a size of N×M, the transform coefficients in the resulting block of transform coefficients are each indicated by a vertical coefficient index having a value in the range of 0 to N−1 and a horizontal coefficient index having a value in a range of 0 to M−1. The 2-D sub-sample control parameters may include the following.

1. Sub-Sampling Pattern:
   a) Ratio may specify a 2-D decimation factor. The ratio may be a pair of integer values, Rx and Ry, where Rx is in the range [1, N−1], and Ry is in the range [1, M−1]. A ratio of Rx and Ry means that one coefficient from each Rx X Ry sub-block is to be removed; and
   b) Phase may specify which coefficient is to be removed in a sub-sampling sub-block. If the ratio is Rx and Ry, then the phase may be a pair of integer values, Px and Py, where Px may be in the range of [0, Rx−1], and Py may be in the range of [0, Ry−1].
2. Sub-Sampling Position:
   a) Starting position may specify the coordinate (i.e., coefficient indexes) of a left-top corner from which coefficient sub-sampling may start. Starting position may be a pair of integer values in the N×M range;
   b) Ending position may specify the coordinate (i.e., coefficient indexes) of a right-bottom corner where coefficient sub-sampling may finish. Ending position may be a pair of integer values in the N×M range, and may have the constraint that the ending position be located below and to the right of the starting position.

Figure 4:
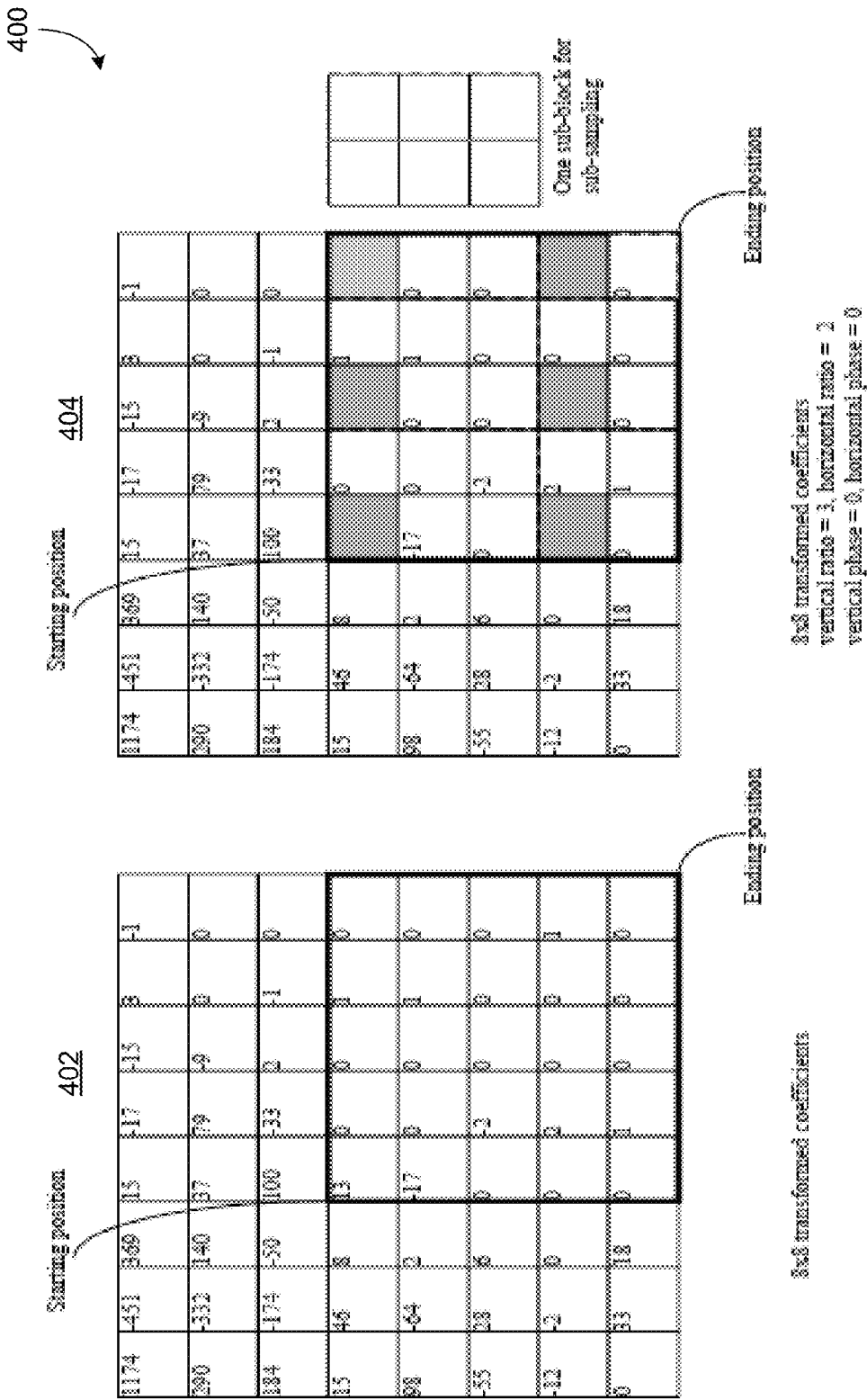
FIG. 4 is an illustration of an example of two-dimensional (2-D) transform coefficient sub-sampling.

FIG. 4 is an illustration of an example 400 of 2-D transform coefficient sub-sampling. Block 402 represents transform coefficients before sub-sampling. Block 404 represents the transform coefficients after sub-sampling. In block 404, the transform coefficients at the decimated positions (indicated in shading) are eliminated. After the 2-D transform coefficient sub-sampling, scanning may be performed on the remaining transform coefficients to reorder them in one-dimension. When the eliminated position (i.e., transform coefficient) is encountered during scanning, the scanning may skip to the next position (i.e., transform coefficient).

Transform Coefficient Sub-Sampling Parameter Model

The transform coefficient sub-sampling may use a fixed sub-sample control parameter model and/or an adaptive sub-sample control parameter model. The following represent three examples of such embodiments.

1. Applying fixed sub-sampling pattern and position parameters. This embodiment is discussed above.
2. Applying encoder-transmitted adaptive sub-sample control parameters. The parameters may be derived using input video picture pixels and other available information at the encoder. The parameters may then be transmitted to the decoder in the encoded bitstream.
3. Applying encoder and/or decoder-derived adaptive sub-sample control parameters.
   a) The parameters may be derived by using a quantization parameter (Qp) value based model at the encoder or the decoder side.
   b) Alternatively, the parameters may be derived using previously coded neighboring pixels at the encoder or the decoder side.

Transform-Core-Dependent Coefficient Sub-Sampling

As mentioned above, in video coding, a series of TUs or transform cores of different sizes may be used. The defined transform may be square or non-square (i.e., SQT or NSQT) as is also discussed above. In embodiments, transform coefficient sub-sampling may operate differently depending on the type of transform core. For example, depending on the transform size, transform coefficient sub-sampling may or may not be applied. In other embodiments, the choice of applying a fixed sub-sample control parameter model or applying an adaptive sub-sample control parameter model may depend on the transform size. These choices may also depend on whether the transform is SQT or NSQT. In other embodiments, depending on whether SQT or NSQT is used, coefficient sub-sampling may or may not be applied. Moreover, the choice of applying a fixed sub-sample control parameter model or applying an adaptive sub-sample control parameter model may depend on whether SQT or NSQT is used.

Mode-Dependent Coefficient Sub-Sampling

In video coding, a coding unit (CU) may include multiple coding modes and prediction modes. For example, a CU may be encoded in intra mode or inter mode. In embodiments, different coding modes may have different transform coefficient sub-sample schemes. For example, for intra mode, transform coefficient sub-sampling may or may not be used. Likewise, for inter mode, transform coefficient sub-sampling may or may not be used.

Both luma and chroma components may be encoded. For a luma component, transform coefficient sub-sampling may or may not be used. Likewise, for a chroma component, transform coefficient sub-sampling may or may not be used.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including at least one computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The system and processing described herein may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Figure 5:
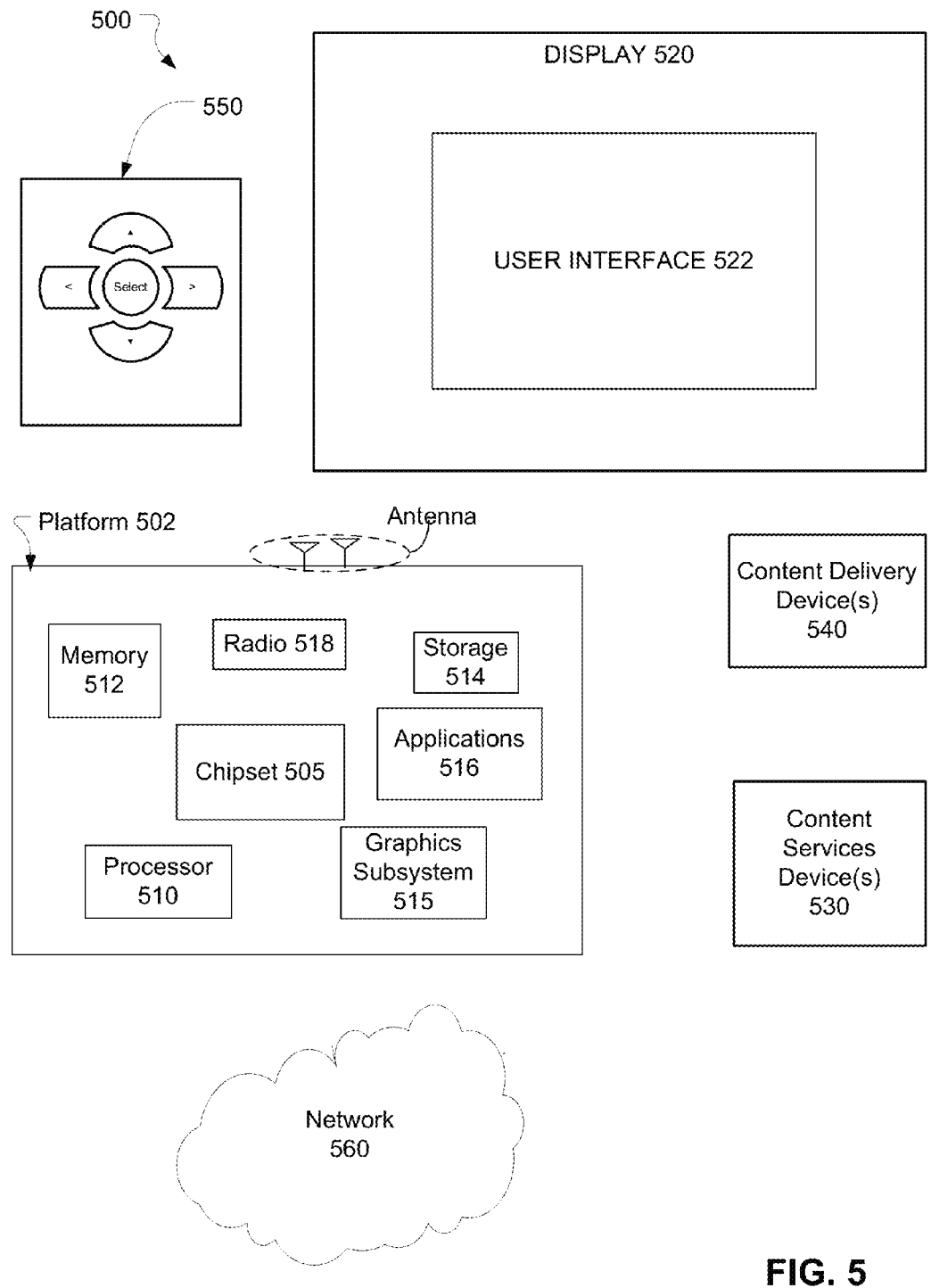
FIG. 5 is a block diagram of a system context of an embodiment.

Moreover, the system and processing described herein may be implemented in a larger system. FIG. 5 illustrates an embodiment of a system 500. In embodiments, system 500 may be a media system although system 500 is not limited to this context.

In embodiments, system 500 comprises a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520. Each of these components is described in more detail below.

In embodiments, platform 502 may comprise any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 510 may comprise dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 514 may comprise technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, Display Port, wireless HDMI, and/or wireless HD compliant techniques. Graphics subsystem 515 could be integrated into processor 510 or chipset 505. Graphics subsystem 515 could be a stand-alone card communicatively coupled to chipset 505.

The graphics and/or video processing techniques described herein may be implemented in various software or hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 518 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In embodiments, display 520 may comprise any television type monitor or display. Display 520 may comprise, for example, a computer display screen, touch screen display, video monitor, television-like device, and/or a television. Display 520 may be digital and/or analog. In embodiments, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In embodiments, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In embodiments, content services device(s) 530 may comprise a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 receives content such as cable television programming including media information, digital information, and/or other content. Examples of content providers may include any cable or satellite television or radio or Internet content providers. The provided examples are not meant to limit embodiments of the invention.

In embodiments, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be echoed on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but integrated into platform 502 and/or display 520. Embodiments, however, are not limited to the elements or in the context shown or described herein.

In embodiments, drivers (not shown) may comprise technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 when the platform is turned "off." In addition, chip set 505 may comprise hardware and/or software support for 5.1 surround sound audio and/or high definition 5.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the invention.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
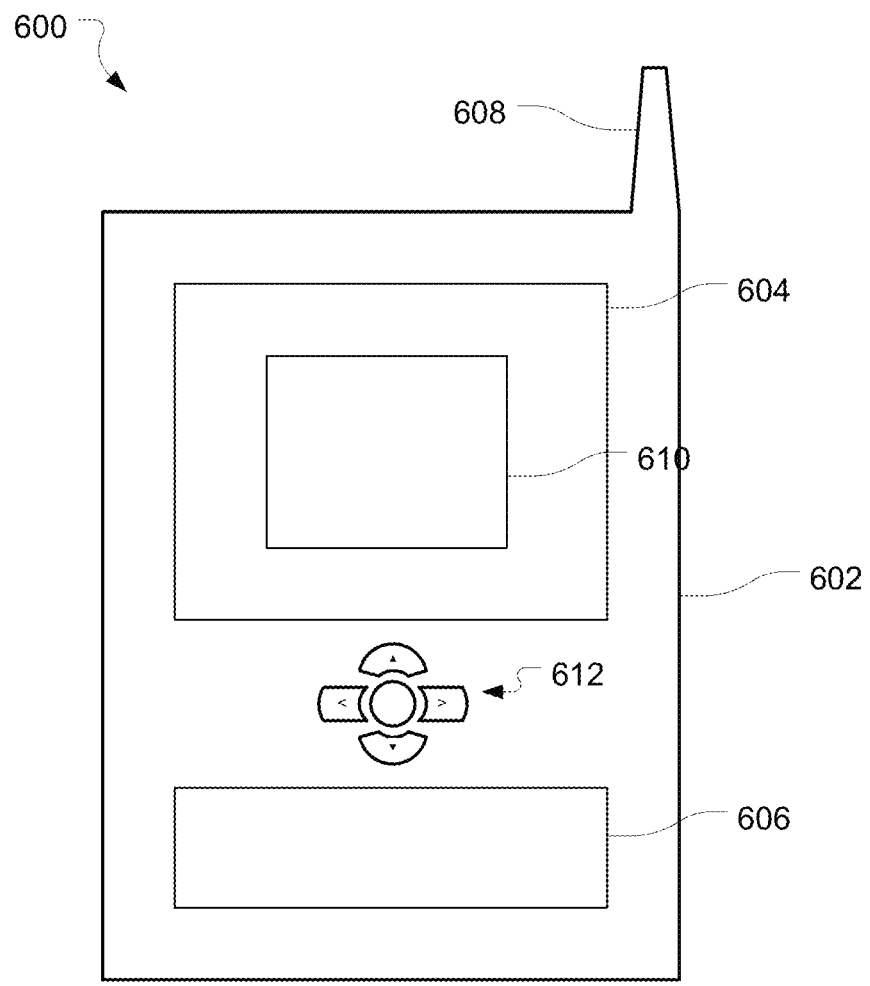
FIG. 6 is an illustration of a mobile device that may incorporate an embodiment.

As described above, system 500 may be embodied in varying physical styles or form factors. FIG. 6 illustrates embodiments of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may comprise a housing 602, a display 604, an input/output (I/O) device 606, and an antenna 608. Device 600 also may comprise navigation features 612. Display 604 may comprise any suitable display unit for displaying information appropriate for a mobile computing device. I/O device 606 may comprise any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone. Such information may be digitized by a voice recognition device. The embodiments are not limited in this context.

Figure 7:
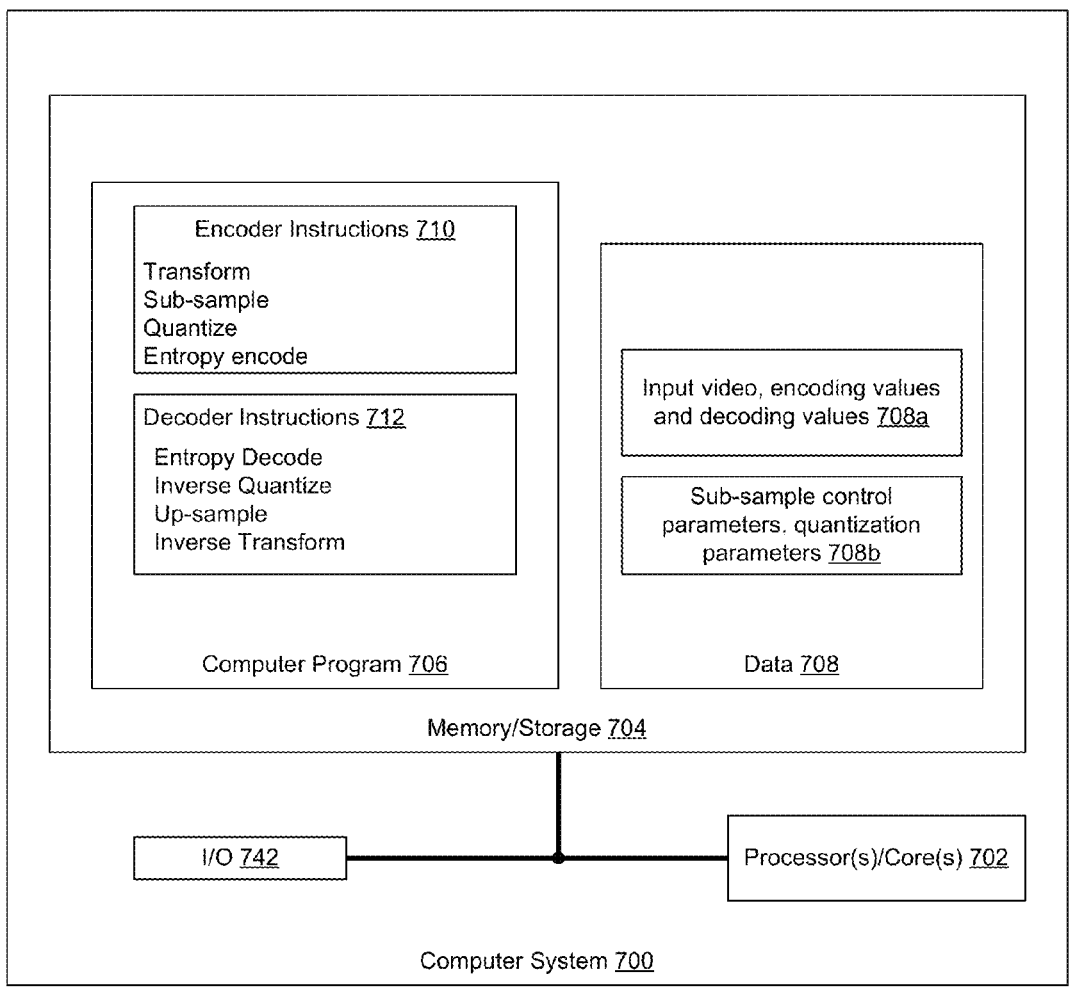
FIG. 7 is a block diagram of an example computer system configured to perform encoding and decoding with transform coefficient sub-sampling and up-sampling, respectively.

FIG. 7 is a block diagram of a computer system 700, configured to perform encoding and decoding with transform coefficient sub-sampling and up-sampling, respectively, as described in one or more examples above. Computer system 700 may be included in any of the systems described above in connection with FIGS. 5 and 6.

Computer system 700 includes one or more computer instruction processing units and/or processor cores, illustrated here as a processor 702, to execute computer readable instructions, also referred to herein as computer program logic.

Computer system 700 may include memory, cache, registers, and/or storage, illustrated here as memory 704, which may include a non-transitory computer readable medium encoded with a computer program, illustrated here as a computer program 706.

Memory 704 may include data 708 to be used by processor 702 in executing computer program 706, and/or generated by processor 702 during execution of computer program 706. Data 708 may include input video, prediction residuals, transform coefficients, sub-sampled transform coefficients, quantized coefficients (quantization values) 708a as applicable to both encoding and decoding, and sub-sample control parameters and quantization parameters 708b.

Computer program 706 may include encoder instructions 710, including transform, sub-sample, quantize, and entropy encode instructions, to cause processor 702 to encode video using sub-sampling as described in one or more examples above.

Computer program 706 may include decoder instructions 710, including entropy decode, inverse quantize, up-sample, and inverse transform instructions, to cause processor 702 to decode encoded video using up-sampling as described in one or more examples above.

In embodiments, components of system 700 directed to encoding embodiments and components directed to decoding embodiments may reside in physically separate devices, e.g., the encoding components reside in a sender side device, while the decoding components reside in a receiver side device, as would be apparent to one having ordinary skill in the relevant arts.

A computer program product embodiment includes a non-transitory computer readable medium encoded with instructions to cause a processor to:

transform prediction residuals derived from video to produce a number of transform coefficients corresponding to frequencies of the video;

sub-sample the transform coefficients based on sub-sample control parameters to remove some of the transform coefficients, and thereby produce a number of sub-sampled transform coefficients that is less than the number of transform coefficients;

quantize the sub-sampled transform coefficients; and encode the quantized sub-sampled transform coefficients.

The sub-sample control parameters may define a decimation ratio, and a sub-sampling frequency range that is less than or equal to a frequency range of the transform coefficients, and the instructions to cause the processor to sub-sample may include instructions to cause the processor to decimate the transform coefficients across the sub-sampling frequency range according to the decimation ratio.

The sub-sampling frequency range may be less than the frequency range of the transform coefficients.

The computer readable medium of claim 2, wherein:

the sub-sample control parameters further include a phase; and the instructions to cause the processor to sub-sample may further include instructions to cause the processor to:

divide the transform coefficients into successive groups of transform coefficients, each group including a number of transform coefficients equal to the decimation ratio; and remove one of the transform coefficients from each group that is offset from a beginning coefficient of that group according to the phase.

The transform coefficients may be arranged in a two-dimensional (2D) array, the sub-sample control parameters may further include first and second decimating ratios corresponding to the rows and columns of the 2D array, respectively, and the instructions to cause the processor to sub-sample may further include instructions to cause the processor to remove transform coefficients from the rows and columns of the 2D array according to the first and second decimating ratios, respectively.

The transform coefficients are arranged in a two-dimensional (2D) array, the instructions may further include instructions to cause the processor to scan the transform coefficients from the 2D array into a one-dimensional (1D) array, wherein the instructions to cause the processor to sub-sample may further include instructions to cause the processor to sub-sample the transform coefficients in the 1D array.

The instructions to cause the processor to quantize may further include instructions to quantize the sub-sampled coefficients based on a quantization parameter that indicates a quantization step size, and the instructions to cause the processor to sub-sample may further include instructions to cause the processor to adaptively adjust one of more of the sub-sample control parameters based on the quantizing quantization parameter, so as to cause a removal of a number of the transform coefficients that increases and decreases respectively when the quantization parameter decreases and increases with changes in the video.

The instructions to encode may further include instructions to cause the processor to:

embed the encoded quantized coefficients and the sub-sample control parameters into an encoded bit stream; and transmit the encoded bit stream.

The instructions may further include instructions to cause the processor to:

receive the encoded bit stream;

recover the quantized sub-sampled transform coefficients and the sub-sample control parameters from the encoded bit stream;

inverse quantizing the recovered quantized sub-sampled transform coefficients to recover the sub-sampled transform coefficients; and up-sample the recovered sub-sampled transform coefficients based on the recovered sub-sample control parameters, to recover the transform coefficients; and inverse transform the transform coefficients, to recover the prediction residuals.

An apparatus embodiment comprises:

a transformer to transform prediction residuals derived from video to produce a number of transform coefficients corresponding to frequencies of the video;

a sub-sampler to sub-sample the transform coefficients based on sub-sample control parameters to remove some of the transform coefficients, and thereby produce a number of sub-sampled transform coefficients that is less than the number of transform coefficients;

a quantizer to quantize the sub-sampled transform coefficients; and an encoder to encode the quantized sub-sampled transform coefficients.

The sub-sample control parameters may define
a decimation ratio, and
a sub-sampling frequency range that is less than or equal to a frequency range of the transform coefficients, and
the sub-sampler may be further configured to decimate the transform coefficients across the sub-sampling frequency range according to the decimation ratio.

The sub-sampling frequency range may be less than the frequency range of the transform coefficients.

In the apparatus:
the sub-sample control parameters may further include a phase; and
the sub-sampler may be further configured to
divide the transform coefficients into successive groups of transform coefficients, each group including a number of transform coefficients equal to the decimation ratio, and
remove one of the transform coefficients from each group that is offset from a beginning coefficient of that group according to the phase.

In the apparatus:
the transform coefficients may be arranged in a two-dimensional (2D) array;
the sub-sample control parameters may further include first and second decimating ratios corresponding to the rows and columns of the 2D array, respectively; and
the sub-sampler may be configured to remove transform coefficients from the rows and columns of the 2D array according to the first and second decimating ratios, respectively.

In the apparatus:
the transform coefficients may be arranged in a two-dimensional (2D) array; and
the sub-sampler may be further configured to
scan the transform coefficients from the 2D array into a one-dimensional (1D) array, and
sub-sample the transform coefficients in the 1D array.

In the apparatus:
the quantizer may be configured to quantize the sub-sampled coefficients based on a quantization parameter that indicates a quantization step size; and
the sub-sampler may be configured to adaptively adjust one of more of the sub-sample control parameters based on the quantizing quantization parameter, so as to cause the sub-sampler to remove a number of the transform coefficients that increases and decreases respectively when the quantization parameter decreases and increases with changes in the video.

In the apparatus, the encoder may be further configured to:
embed the encoded quantized coefficients and the sub-sample control parameters into an encoded bit stream; and
transmit the encoded bit stream.

The apparatus may further comprise:
a decoder to receive the encoded bit stream and recover the quantized sub-sampled transform coefficients and the sub-sample control parameters from the received encoded bit stream;
an inverse quantizer to inverse quantize the recovered quantized sub-sampled transform coefficients to recover the sub-sampled transform coefficients;
an up-sampler to up-sample the recovered sub-sampled transform coefficients based on the recovered sub-sample control parameters, to recover the transform coefficients; and
an inverse transformer to inverse transform the transform coefficients, to recover the prediction residuals.

The apparatus may further comprise:
communication components to communicate with a communication network;
a user interface;
a processor and memory to communicate with the communication components and the user interface; and
a housing to house the transformer, the sub-sampler, the quantizer, the encoder, the processor and memory, the communication components, and the user interface.

A method embodiment comprises:
transforming prediction residuals derived from video to produce a number of transform coefficients corresponding to frequencies of the video;
sub-sampling the transform coefficients based on sub-sample control parameters to remove some of the transform coefficients, and thereby produce a number of sub-sampled transform coefficients that is less than the number of transform coefficients;
quantizing the sub-sampled transform coefficients; and
encoding the quantized sub-sampled transform coefficients.

In the method:
the sub-sample control parameters may define
a decimation ratio, and
a sub-sampling frequency range that is less than or equal to a frequency range of the transform coefficients; and
the sub-sampling may include decimating the transform coefficients across the sub-sampling frequency range according to the decimation ratio.

The sub-sampling frequency range may be less than the frequency range of the transform coefficients.

In the method:
the sub-sample control parameters further may include a phase; and
the sub-sampling may further include
dividing the transform coefficients into successive groups of transform coefficients, each group including a number of transform coefficients equal to the decimation ratio; and
removing one of the transform coefficients from each group that is offset from a beginning coefficient of that group according to the phase.

In the method:
the transform coefficients may be arranged in a two-dimensional (2D) array;
the sub-sample control parameters may further include first and second decimating ratios corresponding to the rows and columns of the 2D array, respectively; and
the sub-sampling may include removing transform coefficients from the rows and columns of the 2D array according to the first and second decimating ratios, respectively.

The transform coefficients may be arranged in a two-dimensional (2D) array, and the method may further comprise scanning the transform coefficients from the 2D array into a one-dimensional (1D) array, wherein the sub-sampling may include sub-sampling the transform coefficients in the 1D array.

In the method:

the quantizing may include quantizing the sub-sampled coefficients based on a quantization parameter that indicates a quantization step size; and the method may include adaptively adjusting one of more of the sub-sample control parameters based on the quantizing quantization parameter, so as to cause the sub-sampling to remove a number of the transform coefficients that increases and decreases respectively when the quantization parameter decreases and increases with changes in the video.

The method may further comprise:

embedding the encoded quantized coefficients and the sub-sample control parameters into an encoded bit stream; and transmitting the encoded bit stream.

The method may further comprise:

receiving the encoded bit stream;

recovering the quantized sub-sampled transform coefficients and the sub-sample control parameters from the encoded bit stream;

inverse quantizing the recovered quantized sub-sampled transform coefficients to recover the sub-sampled transform coefficients;

up-sampling the recovered sub-sampled transform coefficients based on the recovered sub-sample control parameters, to recover the transform coefficients; and inverse transforming the transform coefficients, to recover the prediction residuals.

Decoder Embodiments

Another computer program product embodiment includes a non-transitory computer readable medium encoded with instructions to cause a processor to:

receive an encoded bit stream including encoded, quantized, sub-sampled transform coefficients representative of compressed video, and sub-sample control parameters;

recover the quantized sub-sampled transform coefficients and the sub-sample control parameters from the encoded bit stream;

inverse quantize the quantized sub-sampled coefficients, to produce a number of sub-sampled transform coefficients corresponding to frequencies of the video; and up-sample the sub-sampled transform coefficients based on the recovered sub-sample control parameters, to produce a number of transform coefficients that is greater than the number of sub-sampled transform coefficients.

The recovered sub-sample control parameters may define a decimation ratio, and a sub-sampling frequency range that is less than or equal to the frequency range of the sub-sampled transform coefficients.

The instructions to cause the processor to up-sample may include instructions to cause the processor to add a number of transform coefficients to the sub-sampled transform coefficients in the sub-sampling frequency range based on the decimation ratio, to thereby produce the number of transform coefficients that is greater than the number of sub-sampled coefficients.

The sub-sampling frequency range may be less than the frequency range of the sub-sampled transform coefficients.

The added transform coefficients may each be equal to zero.

In the computer readable medium:

the sub-sampled transform coefficients may be arranged in a two-dimensional (2D) array;

the sub-sample control parameters may further include first and second decimating ratios corresponding to the rows and columns of the 2D array, respectively; and the instructions to cause the processor to up-sample may include instructions to cause the processor to add transform coefficients to the rows and columns of the 2D array according to the first and second decimating ratios, respectively.

The instructions may further include instructions to cause the processor to:

inverse transform the transform coefficients, to produce prediction residuals.

Another apparatus embodiment comprises:

a decoder to receive an encoded bit stream including encoded, quantized, sub-sampled transform coefficients representative of compressed video, and sub-sample control parameters, and recover the quantized sub-sampled transform coefficients and the sub-sample control parameters from the encoded bit stream;

an inverse quantizer to inverse quantize the quantized sub-sampled coefficients, to produce a number of sub-sampled transform coefficients corresponding to frequencies of the video; and an up-sampler to up-sample the sub-sampled transform coefficients based on the recovered sub-sample control parameters, to produce a number of transform coefficients that is greater than the number of sub-sampled transform coefficients.

In the apparatus:

the recovered sub-sample control parameters may define a decimation ratio, and a sub-sampling frequency range that is less than or equal to the frequency range of the sub-sampled transform coefficients; and the up-sampler is may be further configured to add a number of transform coefficients to the sub-sampled transform coefficients in the sub-sampling frequency range based on the decimation ratio, to thereby produce the number of transform coefficients that is greater than the number of sub-sampled coefficients.

The sub-sampling frequency range may be less than the frequency range of the sub-sampled transform coefficients.

The added transform coefficients may each be equal to zero.

In the apparatus:

the sub-sampled transform coefficients may be arranged in a two-dimensional (2D) array;

the sub-sample control parameters may further include first and second decimating ratios corresponding to the rows and columns of the 2D array, respectively; and the up-sampler may be further configured to add transform coefficients to the rows and columns of the 2D array according to the first and second decimating ratios, respectively.

The apparatus may further comprise:

an inverse transformer to inverse transform the transform coefficients, to produce prediction residuals.

The apparatus may further comprise:

communication components to communicate with a communication network;

a user interface;

a processor and memory to communicate with the communication components and the user interface; and a housing to house the decoder, the inverse quantizer, the up-sampler, the processor and memory, the communication components, and the user interface.

Another method embodiment comprises:

receiving an encoded bit stream including encoded, quantized, sub-sampled transform coefficients representative of compressed video, and sub-sample control parameters;

recovering the quantized sub-sampled transform coefficients and the sub-sample control parameters from the encoded bit stream;

inverse quantizing the quantized sub-sampled coefficients, to produce a number of sub-sampled transform coefficients corresponding to frequencies of the video; and up-sampling the sub-sampled transform coefficients based on the recovered sub-sample control parameters, to produce a number of transform coefficients that is greater than the number of sub-sampled transform coefficients.

In the method:

the recovered sub-sample control parameters may define a decimation ratio, and a sub-sampling frequency range that is less than or equal to the frequency range of the sub-sampled transform coefficients; and the up-sampling may include adding a number of transform coefficients to the sub-sampled transform coefficients in the sub-sampling frequency range based on the decimation ratio, to thereby produce the number of transform coefficients that is greater than the number of sub-sampled coefficients.

The sub-sampling frequency range may be less than the frequency range of the sub-sampled transform coefficients.

The added transform coefficients may each be equal to zero.

In the method:

the sub-sampled transform coefficients may be arranged in a two-dimensional (2D) array;

the sub-sample control parameters may further include first and second decimating ratios corresponding to the rows and columns of the 2D array, respectively; and the sub-sampling may include adding transform coefficients to the rows and columns of the 2D array according to the first and second decimating ratios, respectively.

The method may further comprise inverse transforming the transform coefficients, to produce prediction residuals.

CONCLUSION

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A non-transitory computer readable medium encoded with instructions to cause a processor to:
   transform prediction residuals derived from video to produce a number of transform coefficients corresponding to frequencies of the video;
   sub-sample the transform coefficients according to a decimation ratio across a sub-sampling frequency range that is less than a frequency range of the transform coefficients;
   quantize the sub-sampled transform coefficients; and
   encode the quantized sub-sampled transform coefficients.

2. The non-transitory computer readable medium of claim 1, wherein:
   the instructions to cause the processor to:
      encode the quantized sub-sampled transform coefficients with multiple encoding modes; and;
      sub-sample the transform coefficients differently for the different coding modes.

3. The non-transitory computer readable medium of claim 1, wherein the transform coefficients are sub-sampled for only one of luma and chroma components.

4. The non-transitory computer readable medium of claim 1, wherein:
   the instructions to cause the processor to sub-sample further include instructions to cause the processor to:
      divide the transform coefficients into successive groups of transform coefficients, each group including a number of transform coefficients equal to the decimation ratio; and
      exclude from the sub-sampled transform coefficients one of the transform coefficients from each group that is offset from a first coefficient of that group according to a phase.

5. The non-transitory computer readable medium of claim 1, wherein:
   the transform coefficients are arranged in a two-dimensional (2D) array;
   the decimation ratio comprises first and second decimating ratios corresponding to the rows and columns of the 2D array, respectively; and
   the instructions to cause the processor sub-sample further include instructions to cause the processor to exclude from the sub-sampled transform coefficients one or more transform coefficients from the rows and columns of the 2D array according to the first and second decimating ratios, respectively.

6. The non-transitory computer readable medium of claim 1, wherein the transform coefficients are arranged in a two-dimensional (2D) array, the instructions further include instructions to cause the processor to scan the transform coefficients from the 2D array into a one-dimensional (1D) array, wherein the instructions to cause the processor to sub-sample further include instructions to cause the processor to sub-sample the transform coefficients in the 1D array.

7. The non-transitory computer readable medium of claim 1, wherein:
   the instructions to cause the processor to quantize further include instructions to quantize the sub-sampled coefficients based on a quantization parameter that indicates a quantization step size; and
   the instructions to cause the processor to sub-sample further include instructions to cause the processor to adaptively adjust sub-sampling of the transform coefficients based on the quantization parameter to cause exclusion from the sub-sampled transform coefficients a number of the transform coefficients that increases and decreases when the quantization parameter decreases and increases, respectively.

8. The non-transitory computer readable medium of claim 1, wherein the instructions to encode further include instructions to cause the processor to:
   embed the encoded quantized coefficients and the sub-sample control parameters into an encoded bit stream; and
   transmit the encoded bit stream.

9. The non-transitory computer readable medium of claim 8, wherein the instruction further include instructions to cause the processor to:

receive the encoded bit stream;
recover the quantized sub-sampled transform coefficients and the sub-sample control parameters from the encoded bit stream;
inverse quantizing the recovered quantized sub-sampled transform coefficients to recover the sub-sampled transform coefficients; and
up-sample the recovered sub-sampled transform coefficients based on the recovered sub-sample control parameters, to recover the transform coefficients; and
inverse transform the transform coefficients, to recover the prediction residuals.

10. A processor to:
transform prediction residuals derived from video to produce a number of transform coefficients corresponding to frequencies of the video;
sub-sample the transform coefficients according to a decimation ratio across a sub-sampling frequency range that is less than a frequency range of the transform coefficients;
quantize the sub-sampled transform coefficients; and
encode the quantized sub-sampled transform coefficients.

11. The processor of claim 10, wherein the processor is to:
encode the quantized sub-sampled transform coefficients with multiple encoding modes; and
sub-sample the transform coefficients differently for the different coding modes.

12. The processor of claim 10, wherein the transform coefficients are sub-sampled for only one of luma and chroma components.

13. The processor of claim 10,
further configured to:
divide the transform coefficients into successive groups of transform coefficients, each group including a number of transform coefficients equal to the decimation ratio; and
exclude from the sub-sampled transform coefficients one of the transform coefficients from each group that is offset from a first coefficient of that group according to a phase.

14. The processor of claim 10, wherein:
the transform coefficients are arranged in a two-dimensional (2D) array;
the decimation ratio comprises first and second decimating ratios corresponding to the rows and columns of the 2D array, respectively; and
the processor is to exclude from the sub-sampled transform coefficients one or more transform coefficients from the rows and columns of the 2D array according to the first and second decimating ratios, respectively.

15. The processor of claim 10, wherein:
the transform coefficients are arranged in a two-dimensional (2D) array; and
the processor is further configured to:
scan the transform coefficients from the 2D array into a one-dimensional (1D) array, and
sub-sample the transform coefficients in the 1D array.

16. The processor of claim 10,
to quantize the sub-sampled coefficients based on a quantization parameter that indicates a quantization step size; and
to adaptively adjust sub-sampling of the transform coefficients based on the quantizing quantization parameter to exclude from the sub-sampled transform coefficients a number of the transform coefficients that increases and decreases when the quantization parameter decreases and increases, respectively.

17. The processor of claim 10, wherein the encoder is further configured to:
embed the encoded quantized coefficients and sub-sample control parameters into an encoded bit stream; and
transmit the encoded bit stream.

18. The processor of claim 17, further comprising:
a second processor to:
receive the encoded bit stream and recover the quantized sub-sampled transform coefficients and the sub-sample control parameters from the received encoded bit stream;
inverse quantize the recovered quantized sub-sampled transform coefficients to recover the sub-sampled transform coefficients;
up-sample the recovered sub-sampled transform coefficients based on the recovered sub-sample control parameters, to recover the transform coefficients; and
inverse transform the transform coefficients, to recover the prediction residuals.

19. The processor of claim 10, further comprising:
communication components to communicate with a communication network;
a user interface;
a processor and memory to communicate with the communication components and the user interface; and
a housing to house the processor and memory, the communication components, and the user interface.

20. A method, comprising:
transforming prediction residuals derived from video to produce a number of transform coefficients corresponding to frequencies of the video;
sub-sampling the transform coefficients according to a decimation ratio across a sub-sampling frequency range that is less than a frequency range of the transform coefficients;
quantizing the sub-sampled transform coefficients; and
encoding the quantized sub-sampled transform coefficients.

21. The method of claim 20, wherein:
the encoding includes encoding the quantized sub-sampled transform coefficients with multiple encoding modes; and;
the sub-sampling includes sub-sampling the transform coefficients differently for the different coding modes.

22. The method of claim 20, wherein the transform coefficients are sub-sampled for only one of luma and chroma components.

23. The method of claim 20, wherein:
the sub-sampling further includes
dividing the transform coefficients into successive groups of transform coefficients, each group including a number of transform coefficients equal to the decimation ratio; and
exclude from the sub-sampled transform coefficients one of the transform coefficients from each group that is offset from a first coefficient of that group according to a phase.

24. The method of claim 20, wherein:
the transform coefficients are arranged in a two-dimensional (2D) array;
the decimation ratio comprises first and second decimating ratios corresponding to the rows and columns of the 2D array, respectively; and
the sub-sampling includes excluding from the sub-sampled transform coefficients one or more transform coefficients from the rows and columns of the 2D array according to the first and second decimating ratios, respectively.

25. The method of claim 20, wherein the transform coefficients are arranged in a two-dimensional (2D) array, the method further comprising scanning the transform coefficients from the 2D array into a one-dimensional (1D) array, wherein the sub-sampling includes sub-sampling the transform coefficients in the 1D array.

26. The method of claim 20, wherein:
the quantizing includes quantizing the sub-sampled coefficients based on a quantization parameter that indicates a quantization step size; and
adaptively adjusting sub-sampling of the transform coefficients based on the quantizing quantization parameter to exclude from the sub-sampled transform coefficients a number of the transform coefficients that increases and decreases when the quantization parameter decreases and increases, respectively.

27. The method of claim 20, further comprising:
embedding the encoded quantized coefficients and sub-sample control parameters into an encoded bit stream; and
transmitting the encoded bit stream.

28. The method of claim 27, further comprising:
receiving the encoded bit stream;
recovering the quantized sub-sampled transform coefficients and the sub-sample control parameters from the encoded bit stream;
inverse quantizing the recovered quantized sub-sampled transform coefficients to recover the sub-sampled transform coefficients;
up-sampling the recovered sub-sampled transform coefficients based on the recovered sub-sample control parameters, to recover the transform coefficients; and
inverse transforming the transform coefficients, to recover the prediction residuals.

* * * * *